United States Patent [19]

Litz

[11] 4,454,077
[45] Jun. 12, 1984

[54] PROCESS AND APPARATUS FOR MIXING A GAS AND A LIQUID

[75] Inventor: Lawrence M. Litz, Pleasantville, N.Y.

[73] Assignee: Union Carbide Corporation, Danbury, Conn.

[21] Appl. No.: 396,281

[22] Filed: Jul. 8, 1982

[51] Int. Cl.³ ............................................. B01F 3/04
[52] U.S. Cl. .................................... 261/91; 209/169; 210/629; 210/219; 261/36 R; 366/295; 416/189
[58] Field of Search ............... 261/87, 91, 93, 36 R; 210/219, 220, 221.2, 619, 629, 169, 170; 416/189; 75/97 R; 435/312–316; 366/102, 104, 295; 266/217

[56] References Cited

U.S. PATENT DOCUMENTS

| | | | |
|---|---|---|---|
| 2,130,402 | 9/1938 | Textor | 261/93 |
| 2,293,183 | 8/1942 | Walker | 261/93 |
| 2,928,661 | 3/1960 | MacLaren | 261/93 X |
| 3,806,452 | 4/1974 | Walker | 261/93 X |
| 3,846,516 | 11/1974 | Carlson | 261/87 |
| 3,933,640 | 1/1976 | Kirk et al. | 261/91 X |
| 4,259,267 | 3/1981 | Wang | 261/93 |
| 4,328,175 | 5/1982 | Roeckel et al. | 261/91 |

FOREIGN PATENT DOCUMENTS 27911 5/1981 European Pat. Off. ............ 261/91

Primary Examiner—Richard L. Chiesa
Attorney, Agent, or Firm—Saul R. Bresch

[57] ABSTRACT

In a process for mixing a gas and a liquid in an apparatus having an axial flow down-pumping impeller located in a draft tube and preceded by a first baffle wherein a vortex and turbulence are created and gas is drawn into the vortex, the improvement comprising providing liquid velocity of at least one foot per second, increasing the turbulence, providing a second baffle below the impeller, and a high shear zone between impeller and the second baffle.

2 Claims, 1 Drawing Figure

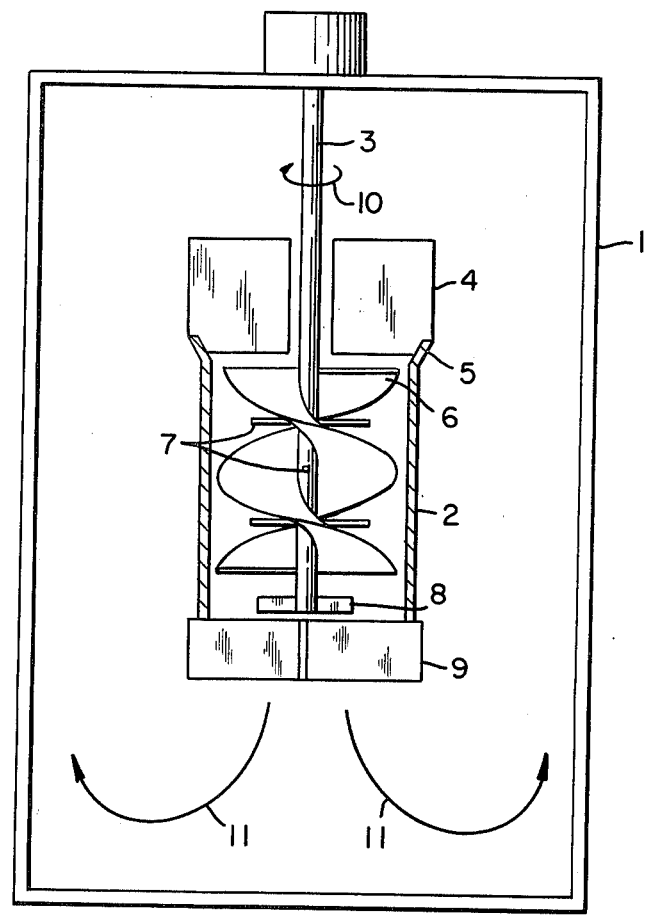

4,454,077

PROCESS AND APPARATUS FOR MIXING A GAS AND A LIQUID

TECHNICAL FIELD

This invention relates to a process and apparatus for mechanically creating a gas/liquid mixture within a body of liquid whereby the contact between the gas and the liquid is optimized.

BACKGROUND ART

The reaction of oxygen with hydrometallurgical process liquids, the hydrogenation of unsaturated organic liquids, and the treatment of sewage with oxygen by the activated sludge process all rely on some means for bringing gases and liquids into contact with each other, preferably in a manner which will utilize the gas efficiently. One particularly successful process utilizes a draft tube containing a helical impeller with a baffled inlet at the head of the tube. While the gas/liquid contact area, which results from the utilization of this process, is commercially acceptable, it is rather apparent that a significant increase in this parameter could be singularly advantageous in that it decreases the amount of usually expensive gas, e.g., oxygen or hydrogen, required to achieve the same result. It is not surprising, then, that the art is continuously striving to boost gas utilization efficiencies, and concomitantly, lower gas costs.

DISCLOSURE OF THE INVENTION

An object of this invention is to provide a process for the contacting of a liquid with a gas in such a manner that gas utilization efficiencies will be increased over those heretofore known in comparable processes.

Other objects and advantages will be apparent hereinafter.

In accordance with the invention an improvement has been discovered in a process for mixing a gas and a liquid in an apparatus comprising, in combination:

(a) a vessel;
(b) a cylindrical hollow draft member open at both ends and having a theoretical axis running from end to end, said axis being in a vertical position and the upper end of the draft member being conically flared;
(c) an axial flow down-pumping first impeller fixedly connected to a rotatable shaft, (i) the first impeller being positioned within the draft tube; (ii) the shaft corresponding in position to the axis; and (iii) the diameter of the first impeller being less than, but proximate to, the diameter of the draft tube;
(d) first vertical baffling means disposed above the impeller;
(e) means for rotating the shaft; and
(f) means for introducing the gas and the liquid into the vessel and for removing gas and liquid from the vessel, the process comprising:

(A) energizing the shaft to provide the first impeller with a rotational speed sufficient to cause (i) vortex formation downward from the surface of the liquid in the vicinity of the first vertical baffling means and the flare of the draft member such that the gas is drawn into and down the draft tube and (ii) turbulence in the draft tube;

(B) introducing a sufficient amount of liquid into the vessel to provide, during operation, a liquid level above the upper end of the draft tube, the liquid level being such that it permits the vortex formation referred to above in paragraph (A); and (C) recovering liquid from the vessel.

The improvement comprises:

(1) providing a rotational speed to the first impeller sufficient to impart a liquid velocity down the interior of the draft tube of at least one foot per second;
(2) increasing the turbulence of the liquid at the shaft proximate to the first impeller;
(3) in the area in the draft tube below the first impeller or in the area below, and immediately exterior to, the lower end of the draft tube, providing second vertical baffling means; and
(4) in the area in the draft tube between the first impeller and the second vertical baffling means providing a radial flow impeller fixedly connected to the shaft whereby a high shear zone is created in the area heretofore mentioned in this paragraph (4).

An improvement has also been discovered in an apparatus for carrying out the aforementioned process comprising, in combination:

(a) a vessel;
(b) a cylindrical hollow draft member open at both ends and having a theoretical axis running from end to end, said axis being in a vertical position and the upper end of the draft member being conically flared;
(c) an axial flow down-pumping first impeller fixedly connected to a rotatable shaft, (i) the first impeller being positioned within the draft tube; (ii) the shaft corresponding in position to the axis; and (iii) the diameter of the first impeller being less than, but proximate to, the diameter of the draft tube;
(d) first vertical baffling means disposed above the impeller;
(e) means for rotating the shaft; and
(f) means for introducing the gas and the liquid into the vessel and for removing gas and liquid from the vessel.

The improvement in the apparatus comprises:

(1) providing protuberances or indentations on the shaft or first impeller, of sufficient size, and positioned, to increase the turbulence at the shaft proximate to the first impeller;
(2) in the area of the draft tube below the first impeller or in the area below, and immediately exterior to, the lower end of the draft tube, providing second vertical baffling means; and
(3) in the area in the draft tube between the first impeller and the second vertical baffling means providing a radial flow impeller fixedly connected to the shaft whereby a high shear zone is created in the area heretofore mentioned in this paragraph (3).

BRIEF DESCRIPTION OF THE DRAWING

The sole FIGURE of the drawing is a schematic side view cross-section of an embodiment of the apparatus invention herein described and in which subject process may be carried out.

DETAILED DESCRIPTION

Referring to the drawing:

Vessel 1 is a vessel in which draft tube 2 is centrally and vertically disposed. The system may be closed or sealed to prevent the uncontrolled passage of gases into or out of the system depending on process requirements. A closed system is generally unnecessary where atmospheric air is being used. Draft tube 2 extends from above the upper end of helical impeller 6 to a point substantially above the floor of vessel 1 thus providing adequate room for liquid circulation. The distance from the floor of vessel 1 to the bottom of draft tube 2 is, typically, at least equal to the diameter of the draft tube. The top portion of draft tube 2 is a flared conical inlet, i.e., conical inlet 5, whose wall, on the outside, forms an obtuse angle of about 145 to about 175 degrees with the outside of the vertical wall of draft tube 2. Several vertical inlet guide baffles 4 are inserted in conical inlet 5, the number of baffles, which are simply thin sheets of structurally rigid material, being about 2 to about 8. They are, generally equilaterally spaced and symmetrically positioned around conical inlet 5 and, for maximum effectiveness, each baffle is set in a radial plane. Each protuberance (or turbulence promoter blade) 7 is affixed to shaft 3 at the point of maximum distance from the point of attachment of that portion of helical impeller 6 which is in the same horizontal plane. More particularly, in the embodiment, there are six protuberances 7, two, each radially opposed, at one quarter, one half, and three quarters of the helix length down the shaft from a point on the shaft which corresponds to the top of helical impeller 6. Protuberances 7, which in this case are in the form of bars, are at an angle of ninety degrees to the points on shaft 3 where helical impeller 6 intersects shaft 3.

During operation the liquid level is maintained above conical inlet 5. Although not shown in the drawing, appropriate liquid and gas inlets, liquid outlet, and vents are provided as well as structural support for vessel 1 and draft tube 2 and a motor to drive shaft 3 in the clockwise direction of arrow 10. The gas is usually introduced under pressure above draft tube 2. Typical pressures are in the range of about 0.1 psig (pounds per square inch gauge) to about 600 psig and typical gas flow rates are in the range of about 1 scfm (standard cubic feet per minute) to about 1000 scfm. The liquid is generally introduced at about the midpoint of the sidewall of vessel 1. Typical liquid flow rates are in the range of about 2 to about 10,000 gallons per minute. The liquid can, alternatively, be introduced at other points in vessel 1 and the gas can be introduced at various points into vessel 1 and/or draft tube 2.

The temperature inside vessel 1 will depend on the gas/liquid reaction, if any, which is taking place, but is typically in the range of about 25° C. to about 300° C.

Shaft 3 and thus down-pumping impeller 6 are rotated at such a speed that the liquid velocity down the interior of draft tube 2 is greater than about 1 foot per second. The liquid follows the direction of arrows 11 down the inside of draft tube 2 as noted and in an upward direction in the annular space between draft tube 2 and the walls of vessel 1. The preferred liquid velocity down draft tube 2 is the range of about 2 to about 5 feet per second.

In operation, a vortex is formed downward from the surface of the liquid in the vicinity of baffles 4 and conical inlet 5 such that the gas is drawn into and down draft tube 2. The amount of gas ingested into the liquid is a function of the depth of the liquid above conical inlet 5, and the pitch of impeller 6 and its rotational speed. The amount of gas ingested will vary, however, in different processes having different steps and conditions and using different materials.

The parts of the apparatus are made of conventional materials. Various metal alloys, plastics, and glass may be used depending on the composition of the liquids and gases to be mixed. Examples of materials used in the construction of the apparatus are stainless steel, rubber coated steel, and titanium.

For a two foot diameter impeller, the liquid is maintained at a level in the range of about 1 inch to about 15 inches above the uppermost part of draft tube 2, which, as noted, includes conical inlet 5. The preferred level for a two foot diameter impeller is in the range of about 2 inches to about 10 inches above conical inlet 5. For a two inch diameter impeller, it is about one half inch. There will be a different liquid level for each draft tube of different diameter and for each rotational speed. Optimum liquid levels are determined by trial and error. As noted, the liquid level must be such that it will permit the vortex to form and be maintained throughout the process. It will be understood that when the liquid level is below the upper edge of the draft tube, liquid will not be circulated downward through the tube and gas will not be aspirated, and where the liquid level is too high for the draft tube diameter and/or rotational speed, the vortex, if one forms at all, will be too high above conical inlet 5 to feed gas into draft tube 2.

The rotational speed for a two foot diameter impeller is in the range of about 50 revolutions per minute (rpm) to about 1000 rpm and is preferably in the range of about 200 rpm to about 400 rpm.

The helical impeller typically has a single or double helix configuration. Helical impeller 6 is, in fact, two helical impellers connected to shaft 3 such that the leading edges are at an angle of 180 degrees. While helical impellers are preferred, other axial flow impellers such as marine impellers can be used. Radial impeller 8 can be a flat blade turbine with 2 to 8 blades or another type of radial impeller such as a pitched blade impeller. Baffles 9 are similar to vertical inlet baffles 4 in construction. They are also positioned vertically and usually symmetrically, and 2 to 8 baffles, or more, equilaterally spaced, are used, preferably 4 to 8. The plate or sheet which forms each of baffles 4 or 9 are placed vertically so that one vertical edge is at the outer perimeter of draft tube 2 and the other vertical edge is proximate to shaft 3 or its axis. Thus, a top or bottom view would show a pie-shaped structure divided into wedges. In the case at hand, a top or bottom view of baffles 9 would show a pie-shaped structure with four wedges or a cross. The distance from the bottom of radial impeller 8 to the top of baffles 9 is generally less than about one half (0.5) of the diameter of radial impeller 8 and is preferably no greater than about two tenths (0.2) of the diameter of radial impeller 8.

Increased turbulence at the shaft proximate to the helical impellers is caused by bars 7 affixed to shaft 3. These protuberances or projections can take other forms and can be located on the helical impeller as well as the shaft. The turbulence can also be created by providing indentations on the shaft or helical impeller at the position described above for protuberances 7. The indentations can take the form of slots, holes, or dimples.

It is found that the process and apparatus described above are capable of appreciably increasing the flow of gas through the axial flow impeller when compared with similar prior art processes and apparatus and reducing the size of the bubbles exiting baffles 9 to diameters in the range of 0.0625 to 0.125 inch or less. This reduction in bubble size increases the area of contact between the gas and liquid, thus increasing the efficiency of subject process and apparatus.

I claim:

1. In a process for mixing a gas and a liquid in an apparatus comprising, in combination:
   (a) a vessel;
   (b) a cylindrical hollow draft member open at both ends and having a theoretical axis running from end to end, said axis being in a vertical position and the upper end of the draft member being conically flared;
   (c) an axial flow down-pumping first impeller fixedly connected to a rotatable shaft, (i) the first impeller being positioned within the draft tube; (ii) the shaft corresponding in position to the axis; and (iii) the diameter of the first impeller being less than, but proximate to, the diameter of the draft tube;
   (d) first vertical baffling means disposed above the impeller;
   (e) means for rotating the shaft; and
   (f) means for introducing the gas and the liquid into the vessel and for removing gas and liquid from the vessel,
   the process comprising:
   (A) energizing the shaft to provide the first impeller with a rotational speed sufficient to cause (i) vortex formation downward from the surface of the liquid in the vicinity of the first vertical baffling means and the flare of the draft member such that the gas is drawn into and down the draft tube and (ii) turbulence in the draft tube;
   (B) introducing a sufficient amount of liquid into the vessel to provide, during operation, a liquid level above the upper end of the draft tube; and
   (C) recovering liquid from the vessel,
   the improvement comprising
   (1) providing a rotational speed to the first impeller sufficient to impart a liquid velocity down the interior of the draft tube of at least one foot per second;
   (2) increasing the turbulence of the liquid at the shaft proximate to the first impeller;
   (3) in the area in the draft tube below the first impeller or in the area below, and immediately exterior to, the lower end of the draft tube, providing second vertical baffling means; and
   (4) in the area in the draft tube between the first impeller and the second vertical baffling means providing a radial flow impeller fixedly connected to the shaft whereby a high shear zone is created in the area heretofore mentioned in this paragraph (4).

2. In an apparatus for mixing a gas and a liquid comprising, in combination:
   (a) a vessel;
   (b) a cylindrical hollow draft member open at both ends and having a theoretical axis running from end to end, said axis being in a vertical position and the upper end of the draft member being conically flared;
   (c) an axial flow down-pumping first impeller fixedly connected to a rotatable shaft, (i) the first impeller being positioned within the draft tube; (ii) the shaft corresponding in position to the axis; and (iii) the diameter of the first impeller being less than, but proximate to, the diameter of the draft tube;
   (d) first vertical baffling means disposed above the impeller;
   (e) means for rotating the shaft; and
   (f) means for introducing the gas and the liquid into the vessel and for removing liquid from the vessel,
   the improvement comprising:
   (1) protuberances or indentations located on the shaft or first impeller of sufficient size, and positioned, to increase the turbulence at the shaft proximate to the first impeller;
   (2) second vertical baffling means located in the area in the draft tube below the first impeller or in the area below, and immediately exterior to, the lower end of the draft tube; and
   (3) a radial flow impeller fixedly connected to the shaft located in the area in the draft tube between the first impeller and the second vertical baffling means whereby a high shear zone is created in said area.

* * * * *